ELECTRO-OPTICAL CORRELATOR

Filed Oct. 7, 1959 3 Sheets-Sheet 1

SERGEI M. FOMENKO
INVENTOR.

BY George C. Thompson, agent
Morris Spector
ATTORNEY

ELECTRO-OPTICAL CORRELATOR

Filed Oct. 7, 1959 3 Sheets-Sheet 2

SERGEI M. FOMENKO
INVENTOR.

BY George C. Thompson Agent
Morris Spector
ATTORNEY

| STATES OF THE FLIP-FLOPS IN THE X COUNTER | | | STATES OF THE FLIP-FLOPS IN THE Y COUNTER | | | POSITION OF THE PENCIL OF LIGHT IN FIG. 5 | |
|---|---|---|---|---|---|---|---|
| FF 142 | FF 144 | FF 146 | FF 148 | FF 150 | FF 152 | IN THE X POSITION | IN THE Y POSITION |
| 0 | 0 | 0 | 0 | 0 | 0 | +4 | −4 |
| 1 | 0 | 0 | 0 | 0 | 0 | +3 | −4 |
| 0 | 1 | 0 | 0 | 0 | 0 | +2 | −4 |
| 1 | 1 | 0 | 0 | 0 | 0 | +1 | −4 |
| 0 | 0 | 1 | 0 | 0 | 0 | −1 | −4 |
| 1 | 0 | 1 | 0 | 0 | 0 | −2 | −4 |
| 0 | 1 | 1 | 0 | 0 | 0 | −3 | −4 |
| 1 | 1 | 1 | 0 | 0 | 0 | −4 | −4 |
| 0 | 0 | 0 | 1 | 0 | 0 | +4 | −3 |
| 1 | 1 | 1 | 1 | 0 | 0 | −4 | −3 |
| 0 | 0 | 0 | 0 | 1 | 0 | +4 | −2 |
| 1 | 1 | 1 | 1 | 1 | 1 | −4 | +4 |
| 0 | 0 | 0 | 0 | 0 | 0 | +4 | −4 |

SERGEI M. FOMENKO
INVENTOR.

BY George C. Thompson Agent.

ATTORNEY 3,153,222
ELECTRO-OPTICAL CORRELATOR
Sergei M. Fomenko, Woodland Hills, Calif., assignor to Thompson Ramo Wooldridge Inc., Los Angeles, Calif., a corporation of Ohio
Filed Oct. 7, 1959, Ser. No. 844,879
6 Claims. (Cl. 340—146.3)

This invention relates to optical correlation, and more specifically, to optical devices for performing auto-correlation of two images each containing information.

Problems arise in which it is desired to compare two records, one record containing information similar to or identical to that contained on the other and to determine certain relationships therebetween. An example is comparison of a sample aerial photograph with a standard aerial photograph, the point of exposure of the sample photograph being displaced with respect to the point of exposure of the standard photograph and to determine the relative displacement of objects such as terrain, lights, or structures on one photograph with respect to the same on the other. Another example is character or word recognition in documents, in which it may be desired to search for a specific word or groups of words or characters in a document by printing the word or groups of words or characters to be searched for in the document on a separate record and comparing the record with the document. This last example of comparison is extremely useful in the field of information retrieval and machine language translation. Still another example is fingerprint matching, in which it may be desired to compare a sample fingerprint on a record against a large number of fingerprints on file in a separate record, to determine if the sample is on file, and if so, its location in the file or its identity. As pointed out in these examples, it may be desired to compare one record with the other to determine if certain information contained on one record is present on the other, or also if it is, to determine the relative displacement of the information on one record with respect to the information on the other or to determine the exact location of information on one record.

Correlation devices have been devised to perform a comparison, however, in general are limited to all optical, electronic, or electro-optical-mechanical devices. In general, optical schemes suffer from two disadvantages, one being lack of automation hence low speed, and the other inability to obtain high accuracy measurements due to scattered light effects, low resolution and high optical distortion. All electronic schemes have been designed to perform correlation at high speeds but in general are highly complex and require great numbers of components and hence are extremely expensive. Electro-optical-mechanical schemes generally have all the above disadvantages as well as being slow.

In a specific example of the last method of correlation, two pieces of information are compared using an evenly luminous source or a multiple point source of light directed at a phototube. Two photographs are made, one of each piece of information. A negative transparency is made from each photograph and contains the information delineated by transparent patterns. The two negative transparencies are then inserted parallel to each other, in between the source of light and the phototube such that a straight optical center line can be drawn through the center of the source of light, perpendicular to and through the center of the negative transparencies and through the center of the photosensitive surface of the phototube. Two lenses are used, one being inserted betweent the light source and the adjacent negative transparency, to collimate the rays of light emanating from the source of light, allowing parallel rays of light to permeate the transparent areas of the negative transparencies. The other lens, a condensing lens, is inserted between the negative transparency adjacent the phototube and the phototube, to collect all collimated rays of light which permeate both negative transparencies and to direct them to a small point of light in the same parallel plane as the photosensitive surface of the phototube. Assuming the two pieces of information photographed are identical, but the position of the information on a first negative is displaced with respect to the information on a second, and that the position of the information on the second is on the optical center line mentioned above, relative displacement of the two pieces of information can be determined knowing the position of the point of maximum light intensity in the plane of the photosensitive surface of the phototube. Manual and automatic devices such as mechanical servos may be used to move either the phototube or one negative perpendicular to the optical center line, and to center the point of maximum light intensity upon the photosensitive surface, so that the point of maximum light intensity may be detected. The mechanical displacement of the phototube or movable negative, perpendicular to the optical center line, is proportional to the relative displacement of the two pieces of information and further the intensity of light on the photosensitive surface is then proportional to the autocorrelation coefficient of the information. This method of correlation, as pointed out above, has the disadvantage of being quite slow, and further has moving parts which wear out, also servo systems are in general extremely expensive. Mechanical servo systems are additionally, undesirable where a reading of displacement of the phototube or of the transparency is desired as an input to electronic equipment, equipment such as a digital computer, electronic storage device, or indicating device; the reason being that the point of maximum light intensity must be determined and then converted from a mechanical position to electronic signals of the proper magnitude and waveshape to be compatible with the circuitry of the electronic equipment.

Turning now to the present invention it is an object to provide an electro-optical device operative automatically and at a high rate of speed to autocorrelate.

Another object is to provide an electro-optical correlator to determine displacement of information in one record with respect to information on another.

Still another object is to provide an optical correlator to determine displacement of information in one record with respect to information in another record with greatly improved accuracy over previous optical correlators, by minimizing scatter light effects and optical distortion.

Still another object is to provide an optical correlator which uses essentially a pencil of light to compare two images.

Yet another object is to provide an electro-optical correlator operative to determine the displacement of information in one record with respect to information in another record and to develop digital electronic output signals corresponding thereto.

Yet another object is to provide an electro-optical correlator having a means for developing a pencil of light for comparison of two images, and a digital electronic means for determining the point of emission of the pencil of light in a plane, wherein the digital electronic means also provides digital electronic output signals corresponding to the point of origin of the pencil of light in the plane.

Accordingly, the present invention provides; a correlator including means for emitting essentially a pencil of light; a light sensitive device responsive to said pencil of light; and means for modulating said pencil of light.

Other objects and advantages as well as a better understanding of the invention will become evident to those skilled in the art with reference to the following detailed description.

In the accompanying drawings forming a part of this specification,

Figure 1:
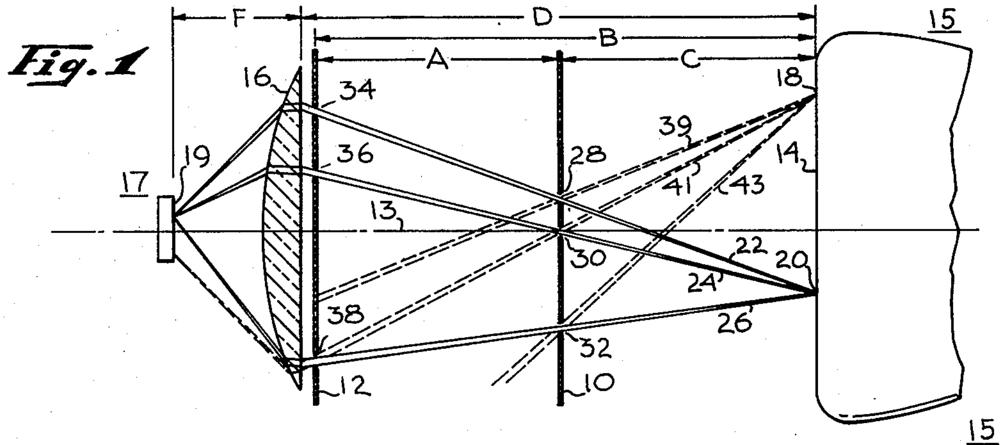
FIGURE 1 is a block diagram of an optical auto-correlator using pencil optics in which masks having transparent patterns of different scale sizes are compared.

Referring to FIGURE 1 there is shown an optical auto-correlator comprising, a cathode ray tube 15 having a face 14 directed at a condensing lens 16, and a multiplier phototube 17 having a photosensitive surface 19, positioned to the left of and with its photosensitive surface 19 at the focal point of the condensing lens 16. The cathode ray tube 15, condensing lens 16 and phototube 17 are then shielded so as to prevent light rays from any source, except those emanating from the face 14 of the cathode ray tube 15, from striking the condensing lens 16. All rays of light which emanate from the face 14 of the cathode ray tube 15 and strike the lens 16 are collected by the condensing lens 16 onto the photosensitive surface 19. A mask 12 is positioned a distance A to the left of and parallel to a mask 10 and together they are positioned such that the centers of both masks are perpendicular to and coincide with an optical center line 13 drawn through the center of the CRT (cathode ray tube) 15 and center of lens 16. For simplicity of explanation, the masks referred to are opaque cards and each contain an identical colinear array of three circular transparent areas; however, the scale of the image formed by the three transparent areas on mask 10 is reduced in size with respect to the scale of the images formed by the three transparent areas on the mask 12, and the pattern on mask 12 is displaced with respect to that on mask 10.

Correlation of the two images on the masks is performed in this example by developing a small point of light in the face 14 of the CRT, which emanates rays of light out from the face 14 over a hemisphere. For optimum correlation, the point of light used must be extremely small compared to the resolution of the images on the masks, and will be referred to as a "pencil of light," a pencil of light being defined in "The Principles of Optics," by Hardy and Perrin, 1932 edition, page 14, "A bundle of rays originating at a single point is known as a pencil. The light used for all practical purposes come from sources of finite area, every point of which emits a pencil. Such a group of pencils is known as a beam. The distinction between these concepts is often illustrated by the statement that a ray of light will pass through two infinitely small holes, a pencil through one small hole and one large hole, while a beam requires two large holes."

Referring again to FIGURE 1, optical correlation of the two images on the two masks is to be performed by emitting a pencil of light from the face 14 of the CRT. By moving the pencil of light about in the two-dimensional plane of the face 14, points will be found such as point 18 which will allow a portion of the rays of light, making up the pencil of light, to penetrate the transparent areas of both masks and strike the lens 16. However, for any one image only one point will be found which will allow the maximum number of light rays to permeate both masks and strike the lens 16, and for the illustration in FIGURE 1, this is at point 20.

The basic principle of optical correlation here, consists essentially of two operations, multiplication of two sets of data and integration or summation of the results. This principle is best understood with reference to FIGURE 1 and the following explanation in which conical bundles of light rays 22, 24 and 26 each originating at the point 20 with an intensity represented by the symbol I, pass through the circular transparent areas 28 and 34, 30 and 36, and 32 and 38, respectively. Transparent areas 28, 30 and 32 have transmissivities which may be represented by the symbols $a_1$, $a_2$, and $a_3$, respectively, and the transparent areas 34, 36 and 38 have transmissivities which may be represented by the symbols $b_1$, $b_2$, and $b_3$, respectively. Therefore, bundles of light rays 22, 24 and 26 strike the lens 16 with intensities represented by the symbols $Ia_1b_1$, $Ia_2b_2$, and $Ia_3b_3$, respectively, the total intensity of light striking the lens 16 then being represented by the summation of the above multiplications as $I(a_1b_1+a_2b_2+a_3b_3)$. If, however, the pencil of light were at the point 18, only one bundle of light rays, bundle 41, will permeate transparent areas on both masks and strike the lens, and the total intensity of light striking the lens 16 would be represented as $$I(a_10+a_2b_3+a_30)=I(a_2b_3)$$

Figure 4:
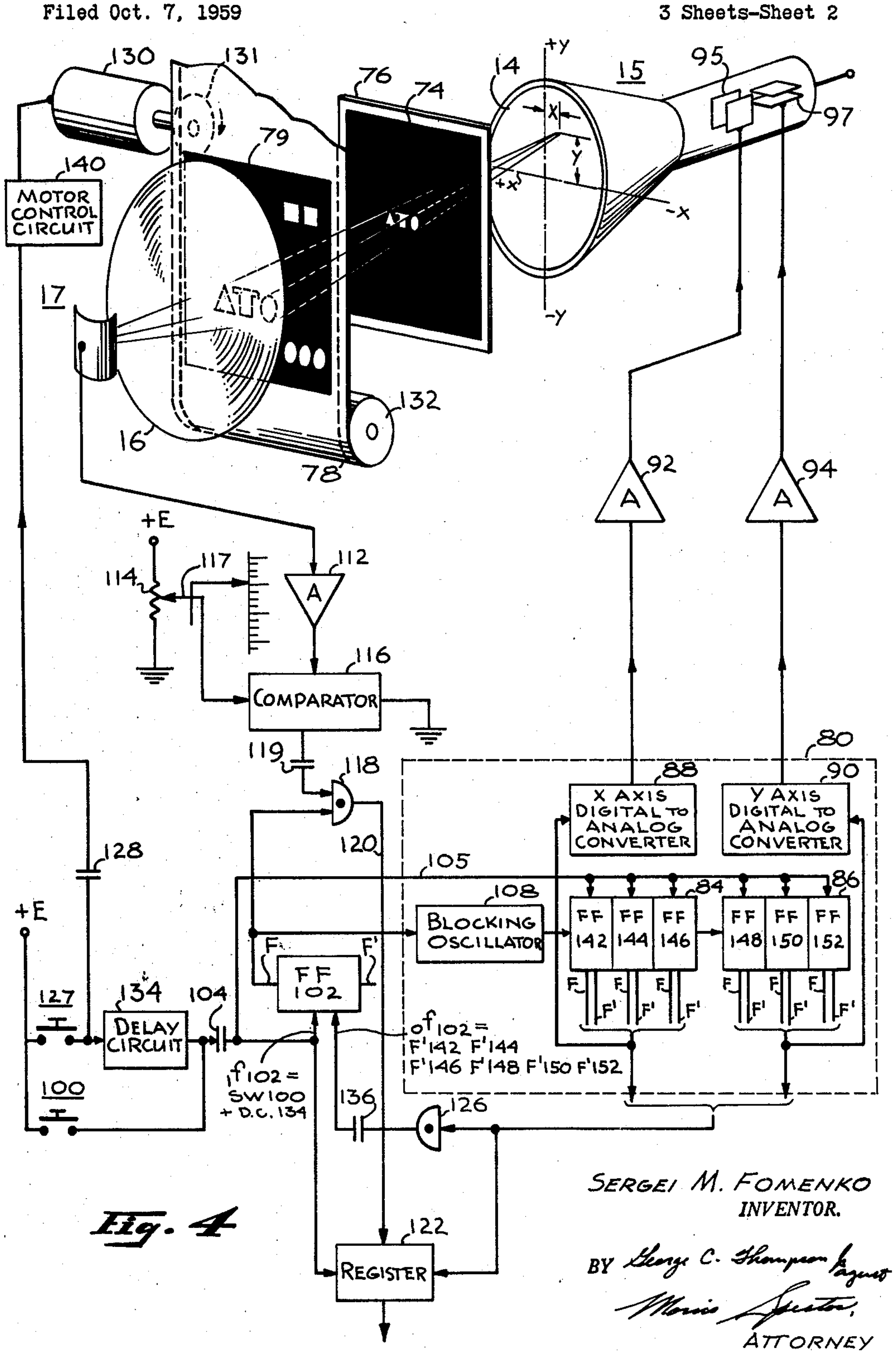
FIGURE 4 is an electro-optical auto-correlator embodying this invention in which correlation is automatically made between two microfilm transparencies, each containing words, to determine if a word on one transparency is present on the second, and if so, to determine the position of the words on the second transparency.

Thus as the point of emanation for the pencil of light is moved about on the face 14, the rays of light from the pencil of light strike either one or both of the masks and are multiplied by the corresponding transmissivities of the masks. However, only at a correlation point such as that represented by correlation point 20 will the multiplication and a summation of the multiplications of light rays be a maximum. The lens 16 collects all light rays striking its surface and concentrates them at a point on the photosensitive surface 19. The phototube integrates the light rays striking its photosensitive surface to give an output current proportional to the number of collected light rays. This theory and the application can be extended to much more complex transparent images, for example, word recognition where the images are printed words, as shown in FIGURE 4, or fingerprint matching in which the images are fingerprints.

Although the correlator is basically quite simple to construct, there are several relative dimensions of importance. For example, relative scale sizes of the two images on the two masks and relative distances from each mask to the face 14 of the CRT 15 are important for accurate optical correlation. This relationship should be as represented by the equation $$\frac{S'}{S}=\frac{C}{B}$$

where: S' and S are the scales of the images on the masks 10 and 12, respectively, and C and B are the perpendicular distances between the face 14 of the CRT and the masks 10 and 12, respectively. Since the dimension C is smaller than the dimension B, it follows that the size of the scale of the image on mask 10 must be reduced with respect to that on mask 12. Another dimensional relationship of importance, for optimum design, relates to overall mask sizes and distance from the face 14 of the CRT to lens 16. Intensity of a bundle of light rays at any point, longitudinally along the bundle, is proportional to the reciprocal of the distance squared from the source of the bundle of light rays to the point in question. Therefore, a bundle of light rays emanating from point 18 and penetrating the transparent areas 30 and 38 would be of less intensity on the lens 16 then a bundle of light rays of the same intensity emanating from point 20 and penetrating the transparent areas 32 and 38. To keep the intensity of a bundle of light rays striking the lens 16 approximately constant regardless of the position on the face 14 from which the light rays emanate, assuming all other variables constant, the distance from the face 14 to the lens 16, dimension D, should be greater than twice the longest side of mask 12. Since rays of light emanating from any point on the face 14 of the CRT and striking the lens 16 must be condensed onto the limited area of the photosensitive surface 19, the convergence of the lens 16 must be very high and the distance from the face 14 to the condensing lens 16 should be greater than the focal length of the condensing lens 16. The focal length of the lens 16 is represented as dimension F and for optimum design should be less than ⅓ the distance D.

In summary, each ray of light, striking the mask and being stopped or permeating, is multiplied by the transmissivity of the masks at the point of contact or permeation. This process may be referred to as modulation of the pencil of light. The condensing lens 16 collects all light rays permeating both the masks and directs them onto the photosensitive surface 19 of the multiplier phototube 17. The multiplier phototube then operates as an integrator, integrating the number of light rays which have permeated the masks to strike its photosensitive surface giving an electrical output current which is directly proportional thereto. Thus, as the point of origin of the pencil of light is moved about on the face 14, the point of correlation, that point being the point which allows the maximum number of light rays to permeate both masks, can be found. Since output current from the multiplier phototube 19 is directly proportional to the total number of light rays permeating both masks, the correlation point will correspond to the maximum output current.

Figure 2:
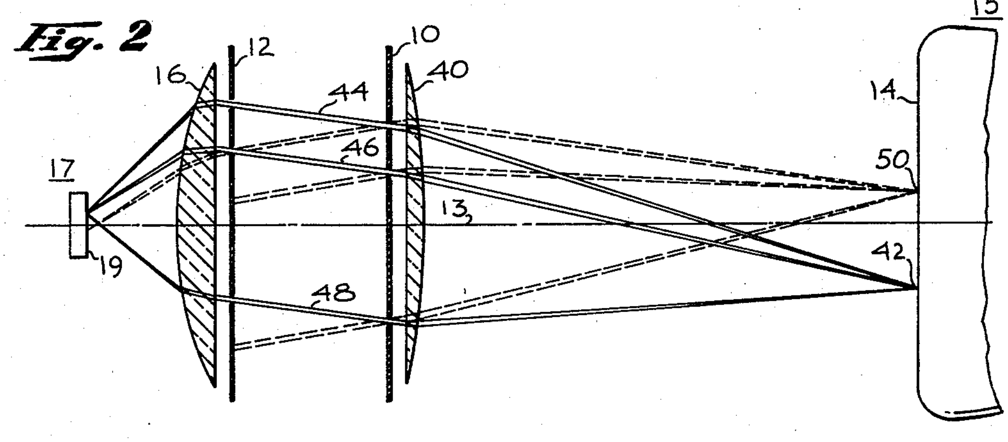
FIGURE 2 is a block diagram of an optical auto-correlator using pencil optics in which masks having transparent patterns of the same scale size are compared.

Situations arise in which it is undesirable or impractical to reduce or expand the image scale on one mask relative to the image scale on the other, therefore, a method for correlation of images of the same size must be used. This can be accomplished using pencil optics, as shown in FIGURE 2, by adding a collimating lens 40 in between and parallel to the face 14 and the mask 10, the lens 40 having a focal length, such that rays of light emanating from the face 14 will be collimated and penetrate both masks 10 and 12 with parallel rays of light, rather than diverging rays as shown in FIGURE 1. FIGURE 2 is substantially identical to FIGURE 1 except that collimating lens 40 has been added. FIGURE 2 shows a pencil of light comprising rays of light emanating from the face 14 at the point 42, the correlation point, and being collimated by the collimating lens 40 so that cylindrical beams of light 44, 46 and 48 will penetrate both masks 10 and 12. However, for any other position of the pencil of light, the number of light rays penetrating both masks will be decreased. Such a point is illustrated at the point 50 where the mask images allow only one cylindrical beam of light to penetrate both masks.

It should be understood that correlation using pencil optics is not limited to situations where the pencil of light is moved about to find the point of correlation, but correlation could be performed by moving one mask in a parallel plane relative to the other, however, this involves mechanical motion which introduces disadvantages discussed above.

Figure 3:
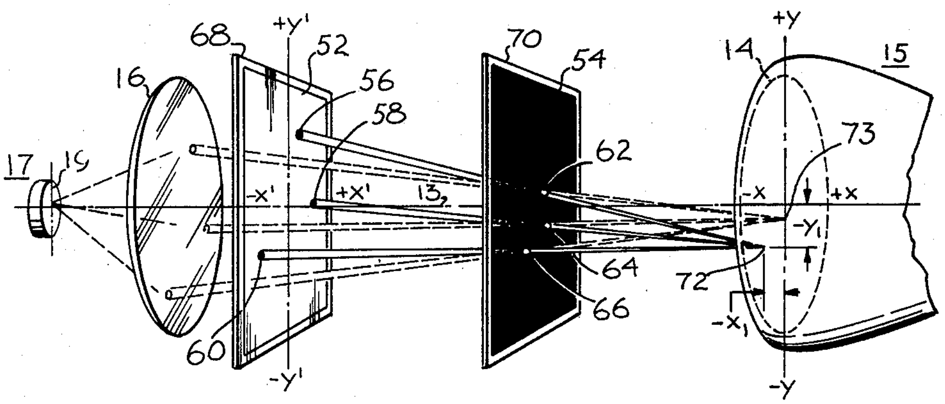
FIGURE 3 is an electro-optical auto-correlator embodying this invention in which two transparencies having transparent areas of different scale sizes are compared, and in which the correlation point sought is where there is a minimum number of light rays permeating both transparencies.

It should further be understood that this invention is not limited to situations where the maximum number of light rays penetrating the masks is searched for but could also include correlation in which a search is made to determine the point of minimum light ray penetration. Such an example is given in FIGURE 3 in which a sample aerial photograph of a certain area is compared with a standard aerial photograph of the same area, the point of exposure of the sample being displaced parallel to the earth with respect to the point of exposure of the standard. In this example it is desired to determine the parallel displacement of objects in one photograph relative to objects in the other. A negative transparency 52 is made from the sample photograph of the area and a positive transparency 54 is made from the standard aerial photograph. The negative transparency 52 is substituted for mask 12 of FIGURE 1, and the positive 54 is substituted for mask 10. Assume both photographs were taken of the same area at night where there were no other lights except the illumination from three airports. The negative transparency 52 shows the airports as three dark or opaque areas 56, 58 and 60. The positive transparency 54 shows the same three airports as three light or transparent areas 62, 64 and 66, respectively. In this example, the negative 52 and positive 54 transparencies are shown mounted as slides, for ease of handling, and mounted in frames 68 and 70 to prevent warping. Mounting of the transparencies in frames to prevent warping is important for high accuracies since any warping will cause optical misalignment and hence errors in correlation measurements.

In this example, there will be only one point of emanation for the pencil of light from the face 14 which will correlate the two photographs to allow an overall minimum number of light rays to penetrate both transparencies, and is represented as point 72. This is best understood, by considering that the opaque areas of the positive transparency 54 will shadow all areas of the negative transparency 52 except the dark or opaque areas which are illuminated by light rays passing through the corresponding transparent areas on the transparency 54. Any other point of emanation for the pencil of light such as point 73 will allow a greater number of light rays to penetrate through both transparencies and be collected by the lens 16 onto the photosensitive surface 19. This may be understood in FIGURE 3 by considering that light rays will pass through the transparent areas of positive transparency 54 at such an angle that they will not strike the corresponding opaque areas on the negative transparency 52. Thus in contrast to the examples of FIGURES 1 and 2 where the masks may be both negatives or both positives of photographs and in which the correlation point corresponds to the point where a maximum output current is received from the multiplier phototube 17, in FIGURE 3 the correlation point corresponds to the point of minimum output current.

Displacement of the pattern on transparency 52 relative to the position of the pattern on transparency 54 may be calculated from the following equations;

$$X' = -\frac{A}{C}X,\ Y' = -\frac{A}{C}Y$$

where X′ and Y′ are coordinates of the unknown displacement and X and Y are the known coordinates indicated on the face 14 of the CRT 15. Assumptions made in the derivation of these equations are; the center of the airport pattern on positive 54 is on the optical center line 13 described in FIGURE 1, and relative displacement is desired in the scale dimensions of the image on negative transparency 52. The relative displacement of the images for the correlation point 72, where the point of emanation is at $X=-X_1$ and $Y=-Y_1$, is represented by the equations $$X' = \frac{A}{C}X_1\ Y' = \frac{A}{C}Y_1$$

It should be noted, however, that before accurate correlation measurements may be made on aerial photographs, the photographs must be corrected for any differences in angle of exposure and elevation of exposure.

FIGURE 4 is a block diagram showing a specific embodiment of the invention for automatically performing character or word searches in documents. The optical portion of the correlator, comprising the CRT 15, phototube 17 and condensing lens 16 is substantially identical to that represented in block diagram form in FIGURES 1 and 3. However, a frame 79 of a roll 78 of microfilm in FIGURE 4, corresponds to mask 12 in FIGURE 1 and a negative transparency 74 corresponds to mask 10. The frame 79 is a transparent negative made from a photograph of a page of the document to be searched. To give the characters or letters in the document the maximum amount of transmissivity and areas surrounding the charactors or letters the minimum amount, they are preferably printed with black ink on white paper, and then as the exposure is made, it is greatly over-exposed. These steps in making the negative transparenceies are important especially if small differences of intensity of permeating light are to be detected.

Characters or words to be searched for in the document are printed, preferably in black ink on white paper with the same kind of type as the document is printed with and photographed, preferably with the same camera lens as the document is photographed with to obtain sharp contrast between characters or letters and the paper and to obtain substantially the identical characters or letters as the document contains. A negative transparency of the photograph then becomes negative transparency 74, and is mounted in a supporting frame 76. Although not shown, to avoid confusion, the frame 79 may be held in position by film guides. Again it should be noted that mounting the transparent negatives, or the use of film guides, to prevent warping is important, since any warping of the transparencies will cause errors in correlation measurements.

Before describing the operation of the correlator, a brief explanation of terminology to be used in the following discussion will be presented. Flip-flops are bistable devices having two states, one state called a true state represented by a binary digit "1" and the other false state represented by a binary digit "0." Referring to FIGURE 4, there is a flip-flop 102. To set flip-flop 102 to the true state, an input called, $_1f102$ must be pulsed, to set flip-flop 102 to the false state, an input called $_0f102$ must be pulsed. A flip-flop, for example 102, has two output lines, called F102 and F'102, the voltage on the output lines being limited to two potential levels, for example, a high potential level (i.e., +10 volts) and a low potential level (i.e. 0 volts). With the flip-flop 102 in the true state, output line F102 will have a high potential level on it, while the potential level on output line F'102 is low. If the flip-flop 102 is in the false state output line F102 has a low potential level on it and output line F'102 has a high potential level on it.

As discussed above the face 14 is scanned by moving a pencil of light about on the face 14 and by observing the output current, from the multiplier phototube 17, the point of maximum output current can be detected and corresponds to the correlation point.

The pencil of light has been referred to in the discussion thus far, as emanating from the face 14 of the CRT 15, however, known to those skilled in the art the pencil of light may be developed by electrons from an electron beam which strike a phosphorous surface on the inside of the face 14 thereby developing the light rays comprising the pencil of light. Deflection devices such as the X and Y deflection plate 95 and 97, respectively, may be used and are responsive to voltage signals to determine the point at which the electron beam strikes the phosphorous surface of the face 14. A sweep generator 80 is employed to generate voltage signals corresponding to the pattern which is selected for the pencil of light to traverse on the face 14, the voltage signals are then amplified by deflection plate amplifiers 92 and 94 and the amplified voltage signals are applied to the respective deflection plate. It should be understood, however, that the deflection plate amplifiers are not necessary if the voltage output signals from the swep generator 80 are of sufficient magnitude for proper operation of the deflection plates.

The design of the sweep generator 80 depends on the sweep pattern selected. The sweep pattern selected depends on the particular application and the accuracy desired for the correlation measurements. For illustrative purposes, the sweep pattern shown in FIGURE 5 is used, and as indicated, has sixty-four distinct positions for the pencil of light, eight positions in the X direction and eight in the Y direction; where X and Y are the two coordinates shown on the face 14.

Figures 5, 6:
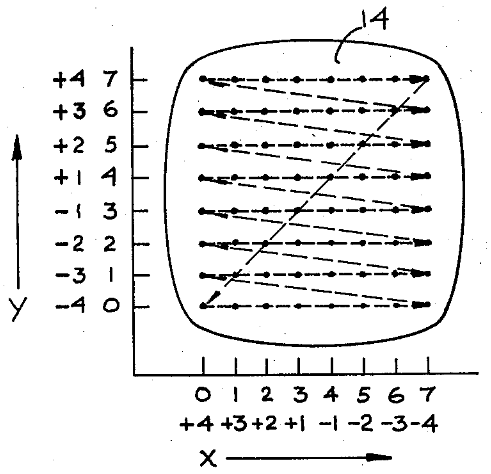
FIGURE 5 is a graphical representation of the pattern of the light source as it would appear on the cathode ray tube.
FIGURE 6 is a chart showing the point of emanation described in X and Y coordinates corresponding to the states of the X and Y flip-flops.

To provide the sweep pattern shown in FIGURE 5, the sweep generator 80 may comprise; a blocking oscillator 108, responsive to a high potential input signal to supply output pulses; $x$ and $y$ axes digital counters 84 and 86; and X and Y digital voltage signal to analog voltage signal converters 88 and 90. To provide eight positions for the pencil of light in the X direction and eight positions in the Y direction each counter must have eight distinct states and, known to those skilled in the art, each digital counter may comprise three bistable devices. The bistable devices may be, as in this example, flip-flop circuits. The three flip-flops, in the X axis counter are represented by the symbols 142, 144 and 146 and in the Y axis counter by 148, 150 and 152, the flip-flops changing states as they count in the sequence depicted in the truth table of FIGURE 6. The X axis counter receives and counts the output pulses supplied by the blocking oscillator 108. Binary digital voltage signals from the outputs of flip-flops in the X and Y axis digital counters 84 and 86 are converted to analog voltage signals by the X and Y axis digital to analog converters 88 and 90 respectively. The analog voltage signals, from the X and Y axes digital to analog converters 88 and 90 are then amplified by the X and Y axis deflection plate amplifiers 92 and 94, respectively, and applied to the X and Y deflection plates 95 and 97, respectively.

FIGURE 6 shows the point of emanation of the pencil of light in X and Y coordinates, corresponding to the states of the X and Y axes flip-flops. The physical position of the coordinates is shown on the face 14 in FIGURE 5. When both counters are in the zero state, i.e., all flip-flops in the counters in a "false" state, the electron beam will be positioned in the $X=+4$, $Y=-4$ position. Upon receipt of voltage pulses from the blocking oscillator the X axis counter flip-flops change states counting from the initial zero state, to the eighth state, i.e., where all flip-flops are in the true state. Upon receipt of the next pulse the X axis counter recycles to its inital zero state, pulsing the Y axis counter from its initial, zero state, to a number "1" state, represented by the flip-flops 148, 150 and 152 as 1, 0, 0, respectively. The Y axis continues to count each time a pulse is received from the X axis counter until the Y axis counter is in the eighth state represented by the flip-flops $Y_1$, $Y_2$ and $Y_3$ as 1, 1, 1, respectively, and upon receipt of the next pulse the Y axis counter recycles to the initial zero state. Correspondingly, the point of impact of the electron beam with the face 14 is repeatedly moved in the X direction from $X=+4$ to $X=-4$ and then returning to $X=+4$, increasing one increment in the Y axis direction each time until the pencil of light is in the $X=-4$, $Y=+4$ position. The next pulse from the blocking oscillator 108 causes both counters to be reset to their zero state, and the position at which the electron beam strikes the face 14 returns to the $X=+4$, $Y=-4$ position.

To start the correlator of FIGURE 4 in operation, negative transparency 74 and microfilm frame 79 are positioned and the contacts of switch 100 are closed. One contact of the switch 100 is connected to a source of constant potential, not shown, represented by the symbol +E and the other contact connected to the $_{1}f102$ input of a control flip-flop 102 through a differentiating capacitor 104. The capacitor 104 differentiates the voltage from the source of constant potential +E causing a gating pulse to be applied to the $_{1}f102$ input of flip-flop 102 switching it from its initial "false" state to the "true" state. The flip-flop 102 side of the capacitor 104 is also connected to a reset line 105 which is connected to the flip-flops in the X and Y axes digital counters 84 and 86. All flip-flops in the X and Y axes counters are responsive to a pulse on the reset line 105, to be reset to the "false" state regardless of their previous states. An output of the flip-flop 102, designated as output F102, is connected to the input to the blocking oscillator 108, therefore, when flip-flop 102 is in the "true" state, the F102 output and thus the input to the blocking oscillator 108 is in a high voltage condition and the blocking oscillator 108 starts supplying voltage pulses.

The point of correlation for the images on the two transparencies 74 and 79 is found by examining output current from the multiplier phototube 17, to detect output currents above a predetermined threshold, where the threshold corresponds to the current out of the multiplier phototube 17 expected at the correlation point. This is accomplished as follows in FIGURE 4; output current from the multiplier phototube 17 is amplified with amplifier 112 to develop an output potential proportional to the current developed by the multiplier phototube 17. The source of potential +E, not shown, is connected across the ends of windings of a potentiometer 114 and slider 117 of the potentiometer 114 is set so that it has a potential on it corresponding to the expected output potential from the amplifier 112 at the correlation point. Output potential from the amplifier 112 is compared to the preset potential on slider 117 by a compare circuit 116. The compare circuit is designed to give a constant voltage output signal of substantially the same magnitude as that received from the +E potential source whenever output potential from the amplifier 112 exceeds the potential set on the slider 117. When the potential out of the amplifier 112 is less than the potential on slider 117 the output of the comparator circuit 116 is at a low potential (i.e., 0 volts).

The output from the compare circuit 116 is connected to an input of an "and" gate 118 through a differentiating capacitor 119. The differentiating capacitor 119 differentiates the output from the compare circuit to give a positive potential gating pulse whenever the output of the compare circuit changes from a low potential to a high potential. The gate 118 logically "ands" the gating pulse and the F102 output signals from the flip-flop 102 to give a high potential output pulse whenever the output F102 has a high potential level on it and at the same time a gating pulse is received.

As discussed above, the X and Y axes digital counters count until they both recycle to a zero state at which time the scan cycle is over. To stop the output from the blocking oscillator the input is changed from a high potential level to a low potential level. To accomplish this the $_{0}f102$ input of flip-flop 102 is pulsed whenever both counters return to the zero state. To provide the necessary pulse the $_{0}f102$ input of flip-flop 102 is connected to the output of an "and" gate 126 through a differentiating capacitor 136. The F'144, F'146, F'148, F'150 and F'152 outputs of the X and Y axes digital counters are inputs to the "and" gate 126. Thus whenever all flip-flops in both counters return to a false condition, all inputs to the "and" gate 126 go to a high potential causing the output of the gate to change from a low to a high potential. The capacitor 136 differentiates the voltage, causing a gating pulse to be applied to the $_{0}f102$ input of flip-flop 102, setting it to the "0" state.

The position of the correlation points may be stored in an electronic storage device, entered into a digital computer for computation or they may be displayed on an indicator of some type. In this example, the points of correlation are to be entered into a storage device, for example, a magnetic core memory, contained in a register 122. To integrate the register 122 with the correlator, output signals from the X and Y axes digital counters 84 and 86 and the output signals from the logical "and" gate 118, are used as inputs to the register 122. In register 122 the X and Y digital output signals may be logically "anded" with the output signals from "and" gate 118, and then used as inputs to the memory device in register 122. The memory device then can record the state of the X and Y axes counters, each time a point of correlation is detected causing the "and" gate 118 to generate a positive voltage pulse. The reset line 105 may also be connected as an input to the memory device in register 122, and be effective to reset the memory device to clear out any previous information in the register 122 at the start of a correlation cycle.

A switch 127 is included, and when depressed causes the microfilm 78 to be advanced. The microfilm 78 is advanced one frame and a correlation cycle started by closing the contacts of the switch 127. When the contacts of the switch 127 are closed, the source of potential +E is connected to the input to a motor control circuit 140. The control circuit 140 is responsive to high potential input signals to start and stop the operation of a motor 130. Motor 130 has an output shaft mechanically connected to a sprocket 131, and the sprocket 131 engages the microfilm 78 such that when the control circuit 140 receives a high potential input signal and the control circuit 140 starts the motor 130 in operation, the microfilm is advanced one frame moving a frame of microfilm from the reel 132 into the position held by the frame 79.

The switch 127 also applies the +E potential to the switch 100 side of capacitor 104, through a time delay circuit, D.C. 134. The time delay circuit 134 delays the +E potential from being applied to the capacitor 104 long enough for stepping motor 130 to advance the film and allow it to stabilize in the next frame position. After the time delay of delay generator 134 the +E potential is applied to capacitor 104 the same as if switch 100 were depressed and hence a correlation cycle is repeated.

Accuracy of correlation measurements could be increased in the example of FIGURE 4 by increasing the number of flip-flops, in the X and Y counters. This would give greater resolution. Further the invention is not limited to the examples embodying the invention presented here, for example, condensing lens 16 has been shown in all the examples, however, it is not essential for the proper operation of the correlator. Condensing lens 16 is necessary only to insure that all rays of light penetrating the images on both the masks 10 and 12 will be condensed onto the photo-sensitive surface 17 of the multiplier phototube 19. However, if the photosensitive surface 17 is large enough compared to the size of the images on the masks to collect all light rays permeating the masks, condensing lens 16 is not necessary. It should be understood that reference potential developed by potentiometer 114 could be some other reference, and could be incorporated as a part of the compare circuit 116. Further, amplifier 112 is not essential, since the compare circuit 116 may be designed to compare current signals of the level supplied by a multiplier phototube. Further, the photosensitive device is not limited to the multiplier phototube, for example, if the gain of amplifier 112 were increased sufficiently a phototube could be used. The X and Y axes digital counters may be designed to supply analog output signals rather than digital voltage signals, hence making X and Y axes digital to analog converters unnecessary. Other embodiments of the invention presented in the following claims, should be apparent to those skilled in the art.

What is claimed is:

1. An optical correlator comprising: a first mask having at least one image pattern defined by areas of varying transmissivities; a second mask positioned in spaced relation to said first mask and having image patterns defined by areas of varying transmissivities; a light source positioned in spaced relation to said first mask, said light source being a movable, substantially point light source for substantially uniformly illuminating said one pattern on said first mask and projecting its image onto said second mask in accordance with the position of said movable, substantially point light source; means for moving said light source to thereby move said image about said second mask, said second mask being so positioned from said first mask in accordance with relative sizes of image patterns thereon and the pattern transmission media therebetween that a single image of said first image pattern from said first mask may be superimposed upon each of said patterns on said second mask to permit detection of correlation with similar patterns thereon, and detector means for providing an output signal upon correlation of image patterns on said first and second masks.

2. An optical correlator comprising: a first mask having at least one image pattern defined by areas of varying transmissivities; a second mask positioned in spaced relation to said first mask and having image patterns defined by areas of varying transmissivities; a light source positioned in spaced relation to said first mask, said light source being a movable, substantially point light source for substantially uniformly illuminating said one pattern on said first mask and projecting its image onto said second mask in accordance with the position of said movable, substantially point light source; means for moving said light source to thereby move said image about said second mask, said second mask being so positioned from said first mask in accordance with relative sizes of image patterns thereon and the pattern transmission media therebetween that a single image of said first image pattern from said first mask may be superimposed upon each of said patterns on said second mask to permit detection of correlation with similar patterns thereon, and detector means for providing an output signal upon correlation of said first and second mask areas, said detector means including a threshold means and light source position determining means connected to respond to said threshold means upon correlation.

3. An optical correlator comprising: a first mask having an area of intelligence denoted by varying transmissivities; a second mask positioned in spaced relation to said first mask and having areas of varying transmissivities one of which is correlatable with said area on said first mask; a pencil light source emanating from a movable point source and capable of completely illuminating said area on said first mask from each point source position providing only a single image of said area on said first mask on said second mask, said single image being repositioned on said second mask as said pencil light source is moved; and detector means for providing an output signal upon correlation of said first and second mask areas.

4. An optical correlator comprising: a first mask having an area of intelligence denoted by varying transmissivities; a second mask positioned in spaced relation to said first mask and having areas of varying transmissivities one of which is correlatable with said area on said first mask; a pencil light source emanating from a movable point source and capable of completely illuminating said area on said first mask from each point source position providing only a single image of said first mask area of intelligence on said second mask, said single image being repositioned on said second mask as said pencil light source is moved; and detector means for providing an output signal upon substantial correlation of said first mask area and one of said second mask areas, said detector means including a threshold means and light source position determining means connected to respond to said threshold means upon substantial correlation.

5. An optical correlator comprising: a first mask having an area of intelligence denoted by varying transmissivities; a second mask positioned in spaced relation to said first mask and having areas of varying transmissivities one of which is correlatable with said area on said first mask; a light source positioned in spaced relation to said first mask, said light source being a movable, substantially point light source for substantially uniformly illuminating said first mask and projecting its image onto said second mask in accordance with the position of said movable, substantially point light source; said areas being of such size and said masks being of such relative spacing that the dimension of said first area may be superimposed over the dimensions of each of said areas on said second mask, and detector means for providing an output signal upon correlation of said first area and one of said second mask areas, said detector means including a threshold means, said threshold means being responsive to an established first and scond mask transmitted light level.

6. An optical correlator comprising:
- a first mask having an image pattern thereon, said pattern being defined by areas of varying transmissivities;
- a second mask having image patterns defined by areas of varying transmissivities; and
- means for superimposing a single image of said image pattern of said first mask onto each of said image patterns on said second mask to determine similarities therebetween, said means being a light source emanating diverging rays of light energy simultaneously over said image pattern on said first mask, said light source being movable to move said single image on said second mask.

References Cited in the file of this patent

UNITED STATES PATENTS

| | | |
|---|---|---|
| 2,265,149 | Crane et al. | Dec. 9, 1941 |
| 2,375,111 | Jones | May 1, 1945 |
| 2,795,705 | Rabinow | June 11, 1957 |
| 2,924,380 | Demer et al. | Feb. 9, 1960 |
| 2,956,264 | Rohland et al. | Oct. 11, 1960 |